United States Patent [19]

Battiste et al.

[11] Patent Number: 5,371,129
[45] Date of Patent: Dec. 6, 1994

[54] POLY(MONO-1-OLEFIN) COMPOSITIONS

[75] Inventors: David R. Battiste; Kiplin D. Cowan, both of Bartlesville, Okla.

[73] Assignee: Phillips Petroleum Company, Bartlesville, Okla.

[21] Appl. No.: 143,416

[22] Filed: Oct. 26, 1993

[51] Int. Cl.$^5$ ............................................. C08K 5/09
[52] U.S. Cl. ..................................... 524/291; 524/397
[58] Field of Search ............................... 524/397, 291

[56] References Cited

U.S. PATENT DOCUMENTS

| | | | |
|---|---|---|---|
| 3,912,666 | 10/1975 | Spitzer et al. | 260/2.5 E |
| 4,328,319 | 5/1982 | Osipow et al. | 521/78 |
| 4,366,280 | 12/1982 | Yukawa | 524/291 |
| 4,411,926 | 10/1983 | Trumbetas et al. | 426/565 |
| 4,422,877 | 12/1983 | Spitzer et al. | 106/122 |
| 4,477,371 | 10/1984 | Huber et al. | 252/258 |
| 4,798,679 | 1/1989 | Castro et al. | 252/174 |
| 4,994,529 | 2/1991 | Sekiguchi et al. | 525/375 |
| 4,997,888 | 3/1991 | Sekiguchi et al. | 525/333.8 |
| 5,049,398 | 9/1991 | Saari et al. | 426/20 |
| 5,093,146 | 3/1992 | Calandro et al. | 426/619 |

*Primary Examiner*—Veronica P. Hoke
*Attorney, Agent, or Firm*—Carl D. Corvin

[57] ABSTRACT

A composition of matter is provided comprising:
(a) a poly(mono-1-olefin);
(b) from about 0.0001 to about 5 weight percent octadecyl 3-(3,5-di-t-butyl-4-hydroxyphenyl)propionate; and
(c) from 0.0001 to 0.04 weight percent Sodium stearoyl lactylate;

where the weight percents are based on the weight of said poly(mono-1-olefin). This composition exhibits corrosion resistance and color stability.

7 Claims, No Drawings

POLY(MONO-1-OLEFIN) COMPOSITIONS

BACKGROUND OF THE INVENTION

This invention is related to the field of poly(mono-1-olefin) compositions.

It is known in the art that certain compounds can be added to a poly(mono-1-olefin) composition in order to improve the properties of tile poly(mono-1-olefin) composition. These added compounds can have an adverse affect on the other properties of tile poly(mono-1-olefin) composition and/or they can interact adversely with the other added compounds in the poly(mono-1-olefin) composition. Finding compounds that can work together harmoniously is a challenging and unpredictable area of polymer science.

SUMMARY OF THE INVENTION

It is an object of this invention to provide poly(mono-1-olefin) compositions.

It is another object of this invention to provide ethylene polymer compositions.

In accordance with this invention a composition of matter is provided comprising:
(a) a poly(mono-1-olefin);
(b) from about 0.0001 to about 5 weight percent octadecyl 3-(3,5-di-t-butyl-4-hydroxyphenyl)propionate; and
(c) from 0.0001 to 0.04 weight percent sodium stearoyl lactylate;
where the weight percents are based on the weight of said poly(mono-1-olefin).

DETAILED DESCRIPTION OF THE INVENTION

The term poly(mono-1-olefin) is defined for the purposes of this application to mean both poly(mono-1-olefins) and poly(mono-1-olefin). In the first case more than one type of mono-1-olefin can be present in the molecular structure. In the second case only one type of mono-1-olefin can be present in the molecular structure. By "type" the applicants mean the molecular arrangement and composition of the mono-1-olefin monomer. Generally, these terms are also referred to as copolymers and homopolymers, respectively.

In general, this invention is broadly applicable to any poly(mono-1-olefin). These poly(mono-1-olefin)s can have an atactic, syndiotactic, or isotactic molecular structure. Furthermore, such a poly(mono-1-olefin) can have a mixture of these type of molecular structures in its macrostructure.

If the poly(mono-1-olefin) is a copolymer it can have a random or regular molecular olefin structure. That is, a random copolymer would have at least two different mono-1-olefins arranged in a random order in the molecular chain. A regular copolymer could either have an alternating or block molecular olefin structure. An alternating molecular olefin structure would have at least two different mono-1-olefins arranged in a repeating order in the molecular chain. For example, if four mono-1-olefins A, B, C, and D were polymerized in an alternating molecular olefin structure a possible example would be ABCDABCD. A block molecular olefin structure would have at least two different mono-1-olefins arranged in a segmented repeating order in the molecular chain. For example, four mono-1-olefins A, B, C, D were polymerized in a block molecular olefin structure a possible example would be AAABBBCCCDDD.

The molecular weight of these poly(mono-1-olefins) can be from about 1,000 to about 20,000,000 as determined by gel permeation chromatography. Preferably, the molecular weight is from about 5,000 to about 2,000,000 and most preferably from 10,000 to 1,000,000 due to ease of production, use, and economic factors. An example of a molecular weight determination method would be using a Waters 150C chromatograph operated at 140° C. with 1,2,4 trichlorobenzene as a carrier solvent for determining the molecular weight of a polyethylene material separated by size exclusion or gel permeation chromatographic columns, SEC or GPC respectively.

Examples of poly(mono-1-olefin)s which can be used in this invention include, but are not limited to, polyethylene, polypropylene, poly(1-butene), poly(3-methyl-1-butene), poly(1-pentene), poly(3-methyl-1-pentene), poly(4-methyl-1-pentene), poly(1-hexene), poly(3-ethyl-1-hexene), as well as, mixtures of two or more of said poly(mono-1-olefin)s. The mono-1-olefins which can be polymerized into poly(mono-1-olefin)s can be characterized by the following formula:

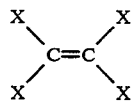

wherein each X is independently selected from the group consisting of hydrogen, fluorine, chlorine, bromine, and iodine; and wherein the R group is selected from the group consisting of hydrogen, fluorine, chlorine, bromine, iodine, and alkyl radicals; and wherein said alkyl radicals have either a linear or branched molecular structure; and wherein said alkyl radicals consist essentially of carbon and hydrogen; and wherein the number of carbon atoms in each alkyl radical is from 1 to about 32 inclusive, preferably from 1 to 20, and most preferably from 1 to 10. Examples of these mono-1-olefins are ethylene, vinyl chloride tetrafluoroethylene, propylene, 1-butene, 3-methyl-1-butene, 1-pentene, 3-methyl-1-pentene, 4-methyl-1-pentene, 1-hexene, 1-heptene, 1-octene, 1-nonene, 1-decene, dodecene, tetradecene, hexadecene, as well as, mixtures of two or more of said mono-1-olefins. These mono-1-olefins can be polymerized either alone or in combination with one or more of the others. Furthermore, they can be polymerized with any of the known catalyst systems or polymerization techniques.

Another component of the poly(mono-1-olefin) composition is octadecyl 3-(3,5-di-t-butyl-4-hydroxyphenyl)propionate also known as octadecyl 3,5-di-t-butyl-4-hydroxyhydrocinnamate. This compound is available from the Ciba-Geigy Corporation under the trade name Irganox 1076. It has the following structure.

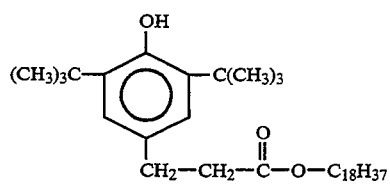

The amount of octadecyl 3-(3,5-di-t-butyl-4-hydroxyphenyl)propionate to use in the poly(mono-1-olefin) composition is from about 0.0001 to about 5 weight percent based on the weight of the poly(mono-1-olefin). It is preferred however, that the amount be from about 0.001 to about 3 weight percent and it is most preferred if the amount is from 0.01 to 1 weight percent.

Another component of the poly(mono-1-olefin) composition is sodium stearoyl lactylate. This compound is available from the C.J. Patterson Company. It has the following structure.

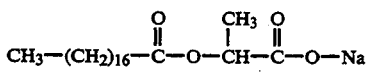

The amount of sodium stearoyl lactylate to use in this composition is from 0.0001 to 0.04 weight percent based on the weight of the poly(mono-1-olefin).

The poly(mono-1-olefin), octadecyl 3-(3,5-di-t-butyl-4-hydroxyphenyl)propionate, and sodium stearoyl lactylate can be contacted together by any manner known in the art. For example, they can be thoroughly blended in a twin screw extruder.

EXAMPLE

These examples are provided to assist a person skilled in the art with further understanding of this invention. These examples are intended to be illustrative of the invention but are not meant to be construed as limiting the reasonable scope of the invention.

The components of the composition were dry blended together for about 30 minutes. Thereafter, the blended composition was extruded through a twin screw extruder to thoroughly intermix the components.

Two tests were performed on the compositions, a "color test" and a "corrosion test".

Color Test

Each sample resin was analyzed by a Hunter Lab D25 Optical Sensor purchased from Hunter Associate Laboratory, Inc. This analysis provided the Hunter "a" and Hunter "b" values.

A negative Hunter "a" value indicates that the sample tends to be green. The more negative the value, the more intense the green color is in the sample. A positive Hunter "a" value indicates that the sample tends to be red. The more positive the value, the more intense the red color is in the sample. Likewise, a negative Hunter "b" value indicates that the sample tends to be blue. The more negative the value, the more intense the blue color is in the sample. A positive Hunter "b" value indicates that the sample tends to be yellow. The more positive the value, the more intense the yellow color is in the sample. Consequently, each sample can have 2 Hunter values, a green-red value and a blue-yellow value.

Corrosion Test

Metal corrosion was evaluated by contacting each sample resin with a 1.25 inch diameter disk of mild carbon steel (SAE 1200). Each steel disk was prepared by washing it with an organic solvent and then sanding it lightly with 400 grit sandpaper. Each sample resin was then compression molded against a prepared disk at a pressure of about 32,600 psi (about 40,000 lbs. total force) for a 15 minute time period at a temperature of 288° C. Each sample resin disk was then allowed to cool to ambient temperature before removing it from the molding press. When cooled, each sample resin was separated from its disk and that disk was placed in a desiccator at 100% relative humidity for 24±2 hours. At the completion of the test, each steel disk was removed from the desiccator and visually compared for pitting corrosion to a uniquely developed series of nine SAE 1200 mild carbon steel disks. These comparison disks systematically varied from 0 to 4 in half-steps with 0 showing no pitting corrosion and 4 showing the greatest pitting corrosion.

TABLE ONE

| Sample | PE[1] | I1076[2] | P920[3] | Corrosion | a | b | z[4] |
|---|---|---|---|---|---|---|---|
| 1 | 99.98 | 0.02 | — | 1.0 | 1.93 | −1.00 | 4.72 |
| 2 | 99.94 | 0.02 | 0.04 | 1.0 | −0.63 | −0.67 | 0.85 |
| 3 | 99.90 | 0.02 | 0.08 | 1.5 | −0.76 | −0.66 | 1.01 |

[1]The weight percent of ethylene polymer resin. This is an ethylene-hexene copolymer with a density of about 0.955 g/cc and a melt index of about 18-20 g/10 min. as determined by ASTMD-1505 and 1238, respectively.
[2]This is the weight percent of octadecyl 3-(3,5-di-t-butyl-4-hydroxyphenyl)-propionate.
[3]This is the weight percent of sodium stearoyl lactylate.
[4]Total color value $Z=((a^2+b^2)^{\frac{1}{2}})$ As can be seen from the data, the use of sodium stearoyl lactylate can lessen the discolorization of the polymer composition. Furthermore, using more than 0.04 parts per 100 parts resin causes a 50 percent increase in the corrosion, which is undesirable.

That which is claimed is:

1. A composition of matter comprising:
   (a) a poly(mono-1-olefin);
   (b) from about 0.0001 weight percent to about 5 weight percent octadecyl 3(3,5-di-t-butyl-4-hydroxyphenyl)propionate; and
   (c) from 0.0001 to 0.04 weight percent sodium stearoyl lactylate;
   wherein the weight percents are based on the weight of said poly(mono-1-olefin).

2. A composition according to claim 1 wherein said poly(mono-1-olefin) is selected from the group consisting of polyethylene, polypropylene, poly(1-butene), poly(3-methyl-1-butene), poly(1-pentene), poly(3-methyl-1-pentene), poly(4-methyl-1-pentene), poly(1-hexene), poly(3-ethyl-1-hexene), and mixtures thereof.

3. A composition according to claim 2 wherein said poly(mono-1-olefin) is polyethylene.

4. A composition according to claim 3 wherein said polyethylene is an ethylene/1-hexene copolymer.

5. A composition according to claim 1 wherein the amount of octadecyl 3-(3,5-di-t-butyl-4-hydroxyphenyl)propionate is from about 0.001 to about 3 weight percent.

6. A composition according to claim 1 wherein the amount of octadecyl 3-(3,5-di-t-butyl-4-hydroxyphenyl)propionate is from about 0.01 to about 1 weight percent.

7. A composition of matter comprising:
   (a) an ethylene polymer composition that comprises ethylene;
   (b) from about 0.0001 weight percent to about 5 weight percent octadecyl 3(3,5-di-t-butyl-4-hydroxyphenyl)propionate; and
   (c) from 0.0001 to 0.04 weight percent sodium stearoyl lactylate;
   where the weight percents are based on the weight of said ethylene polymer.

* * * * *